United States Patent
Iwa et al.

(10) Patent No.: US 9,394,865 B2
(45) Date of Patent: Jul. 19, 2016

(54) DIAPHRAGM DAMPER

(71) Applicant: EAGLE INDUSTRY CO., LTD., Tokyo (JP)

(72) Inventors: Toshiaki Iwa, Tokyo (JP); Yoshihiro Ogawa, Tokyo (JP)

(73) Assignee: Eagle Industry Co., Ltd. (JP)

( * ) Notice: Subject to any disclaimer, the term of this patent is extended or adjusted under 35 U.S.C. 154(b) by 0 days.

(21) Appl. No.: 14/433,180

(22) PCT Filed: Oct. 3, 2013

(86) PCT No.: PCT/JP2013/076930
§ 371 (c)(1),
(2) Date: Apr. 2, 2015

(87) PCT Pub. No.: WO2014/054727
PCT Pub. Date: Apr. 10, 2014

(65) Prior Publication Data
US 2015/0260133 A1    Sep. 17, 2015

(30) Foreign Application Priority Data

Oct. 4, 2012  (JP) .................................. 2012-221811
Jun. 20, 2013 (JP) .................................. 2013-129369

(51) Int. Cl.
*F16L 55/04* (2006.01)
*F02M 37/00* (2006.01)
(Continued)

(52) U.S. Cl.
CPC ........... *F02M 37/0041* (2013.01); *F02M 55/04* (2013.01); *F02M 59/447* (2013.01); *F16J 3/02* (2013.01); *F02M 2200/315* (2013.01);
(Continued)

(58) Field of Classification Search
USPC ....................................................... 138/30, 31
See application file for complete search history.

(56) References Cited

U.S. PATENT DOCUMENTS 1,809,927 A * 6/1931 Emanueli ............... H02G 15/26
                                                            138/30
3,346,014 A * 10/1967 Jacuzzi ...................... E03B 5/00
                                                         137/565.34
(Continued)

FOREIGN PATENT DOCUMENTS

EP      2103805 A2    9/2009
JP      2004-138071 A 5/2004
(Continued)

OTHER PUBLICATIONS

Extended European Search Report for Application EP 13 84 3327 dated Oct. 26, 2015 (5 pages).

*Primary Examiner* — James Hook
(74) *Attorney, Agent, or Firm* — Harness, Dickey & Pierce, P.L.C.

(57) ABSTRACT

The objective of the present invention is to provide a diaphragm damper with which the amount of volume change due to the resonance frequency and pressure can be set freely and the performance of the diaphragm damper can be optimized, without changing the attachment structure for a conventional metal diaphragm and without obstructing the space where fuel flows in a fuel chamber. To this end, this diaphragm damper, wherein a high-pressure gas is enclosed in a high-pressure chamber formed by two disk-shaped metal diaphragms the outer circumferential portions of which have been joined together, is constructed such that rubber-like elastic members are arranged within the high-pressure chamber.

13 Claims, 5 Drawing Sheets

(51) Int. Cl.
   *F16J 3/02*      (2006.01)
   *F02M 55/04*     (2006.01)
   *F02M 59/44*     (2006.01)

(52) U.S. Cl.
   CPC .................. *F02M2200/9015* (2013.01); *F02M 2200/9053* (2013.01)

(56) References Cited

U.S. PATENT DOCUMENTS

| | | | |
|---|---|---|---|
| 3,948,288 A * | 4/1976 | Mayer | F15B 1/18 138/30 |
| 4,164,954 A * | 8/1979 | Ballard | F16L 55/05 137/116.3 |
| 4,312,382 A * | 1/1982 | Gebauer | F16L 55/04 138/30 |
| 5,797,430 A * | 8/1998 | Becke | F04B 11/0016 138/26 |
| 8,201,582 B2 * | 6/2012 | Stroganov | F15B 1/086 138/30 |
| 8,955,550 B2 * | 2/2015 | Oikawa | F16L 55/04 138/26 |
| 2008/0289713 A1 | 11/2008 | Munakata et al. | |
| 2009/0185922 A1 | 7/2009 | Inoue et al. | |
| 2011/0017332 A1 | 1/2011 | Bartsch et al. | |
| 2013/0008544 A1 * | 1/2013 | Briesewitz | B60T 8/4068 138/30 |
| 2013/0230417 A1 | 9/2013 | Kobayashi et al. | |
| 2013/0333785 A1 * | 12/2013 | Vogt | F15B 1/10 138/30 |

FOREIGN PATENT DOCUMENTS

| | | |
|---|---|---|
| JP | 2007-247462 A | 9/2007 |
| JP | 2008-286144 A | 11/2008 |
| JP | 2009-174352 A | 8/2009 |
| JP | 2010-180727 A | 8/2010 |
| JP | 2012-132400 A | 7/2012 |
| JP | 2012-197732 A | 10/2012 |

* cited by examiner

DIAPHRAGM DAMPER

CROSS-REFERENCE TO RELATED APPLICATIONS

This application is a 371 U.S. National Stage Application of International Application No. PCT/JP2013/076930, filed on Oct. 3, 2013, and published in Japanese as WO 2014/054727 A1 on Apr. 10, 2014. This application claims priority to Japanese Application No. 2013-129369, filed on Jun. 20, 2013 and Japanese Application No. 2012-221811, filed on Oct. 4, 2012. The entire disclosures of the above applications are incorporated herein by reference.

BACKGROUND OF THE INVENTION

1. Field of the Invention

The present invention relates to a diaphragm damper.

Further, the present invention relates to a diaphragm damper which is used for reducing pulsation generated in a high-pressure pump used in an engine.

2. Description of the Conventional Art

There has been conventionally known a high-pressure pump which pressurizes fuel supplied from a fuel tank on the basis of a reciprocating movement of a plunger so as to pressure feed to an injector side.

In this kind of high-pressure pump, a fuel chamber is formed in a fuel inlet side, and the fuel is pressurized and discharged by repeating "suction stroke" which sucks the fuel from the fuel chamber to a pressurizing chamber when a plunger moves down, "metering stroke" which returns a part of the fuel in the pressurizing chamber to the fuel chamber when the plunger moves up, and "pressurizing stroke" which pressurizes the fuel when the plunger further moves up after a suction valve is closed.

The high-pressure pump mentioned above has a diaphragm damper for reducing the pulsation generated in the fuel chamber built-in.

Further, the high-pressure pump is variously designed to enhance an effect of reducing the pulsation in the diaphragm.

For example, Japanese Unexamined Patent Publication No. 2004-138071 discloses a device which employs an elastic member for a support member supporting a metal diaphragm constructing a diaphragm damper (Japanese Unexamined Patent Publication No. 2004-138071).

However, in the device described in Japanese Unexamined Patent Publication No. 2004-138071, since the elastic member pinches the metal diaphragm from both upper and lower side directions, a space occupied by the elastic member becomes large, thereby blocking a space in which the fuel flows within the fuel chamber.

Therefore, an amount of the fuel which can be sucked into the fuel chamber is reduced, and there is a risk that the effect of reducing the pulsation by the diaphragm can not be sufficiently obtained.

Further, parts of the high-pressure pump oscillate on the basis of an operation of a suction valve, a plunger and a discharge valve, at the driving time of the high-pressure pump.

The oscillation is transmitted to the fuel, and is transmitted as the pulsation to a piping which is connected to the high-pressure pump, and there is a problem that an abnormal noise is generated due to resonance of the oscillation.

Consequently, there has been proposed a diaphragm damper which is structured such as to support an outer peripheral portion of the metal diaphragm by a rubber-like elastic member and a wave washer (a pressing member) (Japanese Unexamined Patent Publication No. 2012-132400).

However, since the diaphragm damper is structured such as to elastically support the outer peripheral portion of the metal diaphragm by the rubber-like elastic member and the wave washer (the pressing member), a structure is complicated, and the rubber-like elastic member and the wave washer (the pressing member) has a reduced degree of freedom in shapes.

As a result, it has been hard to optionally set an amount of volume change caused by the resonance frequency and the pressure, and it has been hard to achieve optimization of a diaphragm damper performance.

SUMMARY OF THE INVENTION

Problem to be Solved by the Invention

The present invention is made by taking the problem mentioned above into consideration, and an object of the present invention is to provide a diaphragm damper which does not change the conventional metal diaphragm attaching structure, does not obstruct the space in which the fuel flows within the fuel chamber, can optionally set the amount of volume change on the basis of the resonance frequency and the pressure, and can achieve the optimization of the diaphragm damper performance.

Means for Solving the Problem

The diaphragm damper according to the present invention is a diaphragm damper structured such that a high-pressure gas is sealed in a high-pressure chamber formed by two discoid metal diaphragms which are bonded to each other in their outer peripheral portions, wherein a rubber-like elastic member is arranged within the high-pressure chamber.

Effects of the Invention

The present invention achieves the following effects.

According to the diaphragm damper of the invention described in a first aspect, the rubber-like elastic member is arranged within the high-pressure chamber. As a result, the conventional metal diaphragm attaching structure is not changed, the space in which the fuel flows within the fuel chamber is not obstructed, it is possible to optionally set the amount of volume change on the basis of the resonance frequency and the pressure, and it is possible to achieve the optimization of the diaphragm damper performance.

According to a diaphragm damper of the invention described in a second aspect, the rubber-like elastic member is constructed by a discoid sheet portion which is provided so as to come into contact with each of two discoid metal diaphragms, and a plurality of rubber projections which are arranged circumferentially between the sheet portions. As a result, it is possible to effectively damp the resonance of the metal diaphragms without obstructing deformation of the center portion in which the metal diaphragms are deformed most greatly.

According to a diaphragm damper of the invention described in a third aspect, the rubber projection is integrally formed with the sheet portion and is structured such as to alternately extend from the one sheet portion toward the surface of the other sheet portion. As a result, balance of the rubber-like elastic member is good, and it is possible to effectively damp the resonance of the metal diaphragms.

According to a diaphragm damper of the invention described in a fourth aspect, a leading end of the rubber projection is formed into a circular arc shape in its cross section. As a result, the following property is good in relation to the deformation of the metal diaphragms, and it is possible to effectively damp the resonance of the metal diaphragms.

According to a diaphragm damper of the invention described in a fifth aspect, the rubber-like elastic member is arranged in a center portion of the high-pressure chamber so as to be concentric with the metal diaphragms. As a result, the displacement caused by the pressure of the metal diaphragm does not become uneven. Therefore, it is possible to effectively damp the resonance of the metal diaphragms.

According to a diaphragm damper of the invention described in a sixth aspect, the rubber-like elastic member is in contact with both of two metal diaphragms. As a result, it is possible to more effectively damp the resonance of the metal diaphragms.

According to a diaphragm damper of the invention described in a seventh aspect, the rubber-like elastic member is provided with a plurality of positioning leg portions which come into contact with an outer peripheral portion of the metal diaphragms. As a result, since it is possible to inhibit the rubber-like elastic member from moving within the high-pressure chamber, it is possible to more stably damp the resonance of the metal diaphragms.

According to a diaphragm damper of the invention described in an eighth aspect, end portions of a plurality of positioning leg portions are integrally formed with a ring-shaped portion which comes into contact with an outer peripheral portion of the metal diaphragms. As a result, it is possible to more enhance the damping of the resonance in the metal diaphragms, and it is possible to more securely inhibit the rubber-like elastic member from moving within the high-pressure chamber. Therefore, it is possible to more stably damp the resonance of the metal diaphragms.

According to a diaphragm damper of the invention described in a ninth aspect, the rubber-like elastic member is constructed by two discoid portions which come into contact with each of two metal diaphragms in their whole surfaces, and a connection portion which connects the two discoid portions to each other in their center portions. As a result, since the rubber-like elastic member comes into contact with the metal diaphragm in a wider range, it is possible to more securely damp the resonance of the metal diaphragms.

According to a diaphragm damper of the invention described in a tenth aspect, the metal diaphragm is formed a repeated pattern of annular concave portions and annular convex portions which are formed into concentric circles. As a result, it is possible to more securely obtain a pulsation absorbing action of the diaphragm damper.

DETAILED DESCRIPTION OF PREFERRED EMBODIMENTS

A description will be given below of the best mode for carrying out the present invention.

A diaphragm damper according to the present invention is used in a high-pressure pump which pressurizes a fuel supplied from a fuel tank on the basis of a reciprocating movement of a plunger so as to pressure feed to an injector side.

In this kind of high-pressure pump, a fuel chamber is formed in a fuel inlet side, and the fuel is pressurized and discharged by repeating "suction stroke" which sucks the fuel from the fuel chamber to a pressurizing chamber when a plunger moves down, "metering stroke" which returns a part of the fuel in the pressurizing chamber to the fuel chamber when the plunger moves up, and "pressurizing stroke" which pressurizes the fuel when the plunger further moves up after a suction valve is closed.

The diaphragm damper according to the present invention is used for reducing pulsation which is generated in a fuel chamber of the high-pressure pump as mentioned above.

Figure 1:
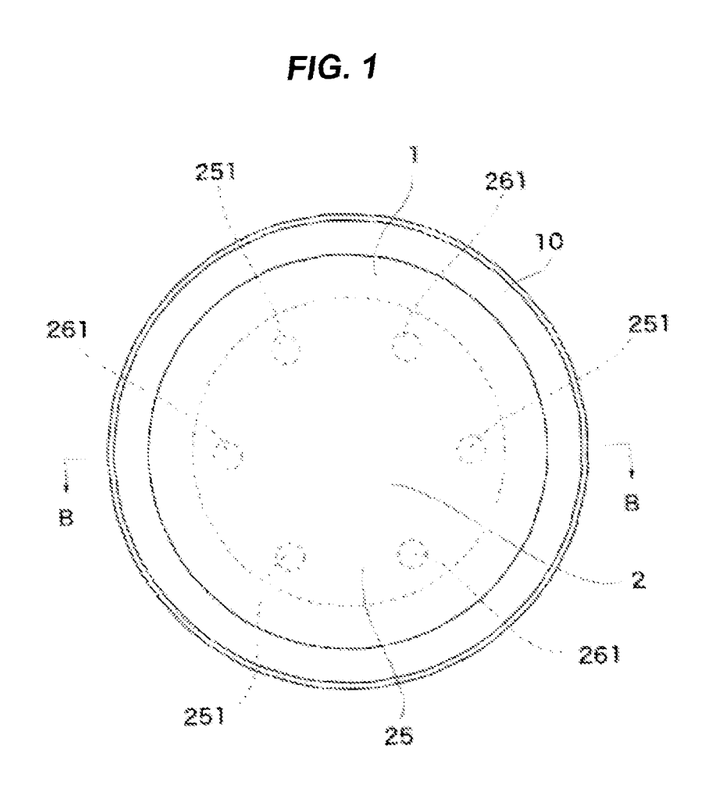
FIG. 1 is a plan view of a diaphragm damper according to the present invention.
Figure 2:
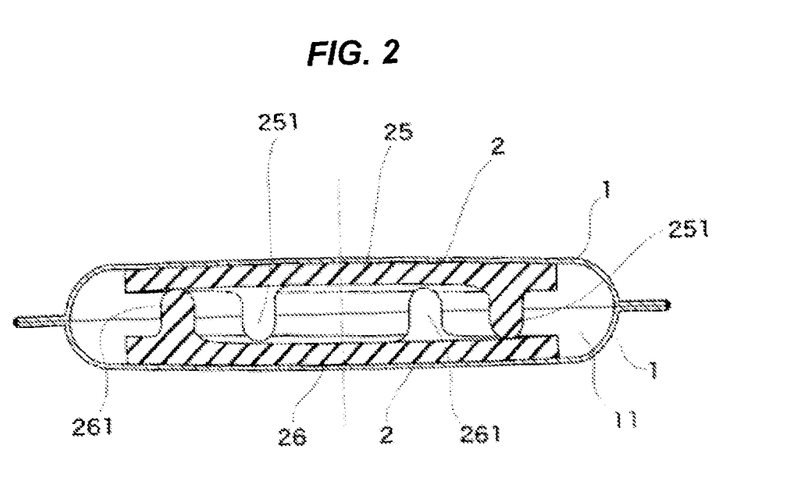
FIG. 2 is a cross sectional view along a line B-B in FIG. 1.
Figure 3:
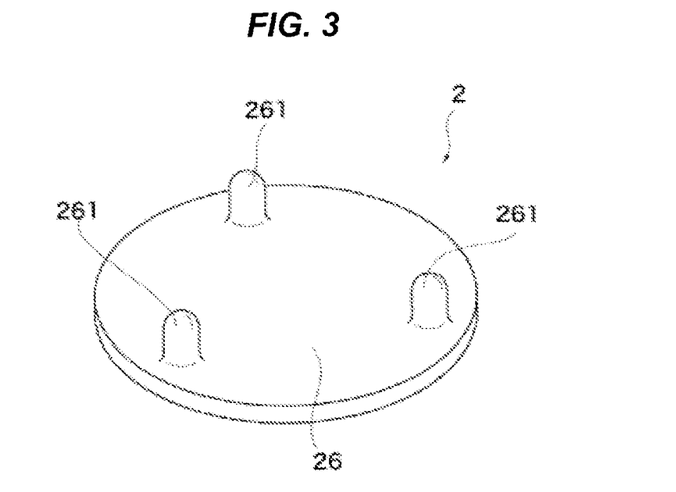
FIG. 3 is a three-dimensional perspective view of a rubber-like elastic member which is used in FIG. 2.
Figure 4:
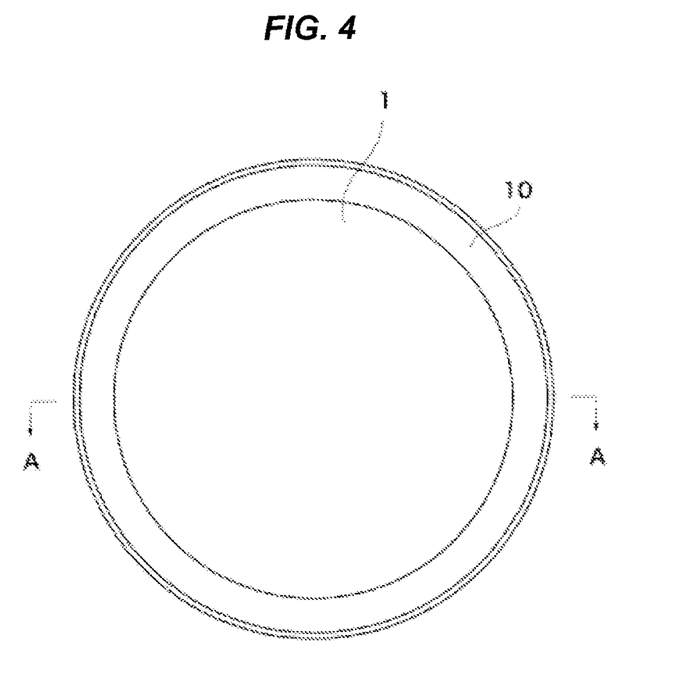
FIG. 4 is a plan view of the other diaphragm damper according to the present invention.

Further, the diaphragm damper according to the present invention is provided with the following structures as shown in FIGS. 1 to 3.

More specifically, a high-pressure gas is sealed into a high-pressure chamber 11 formed by two discoid metal diaphragms 1 and 1 which are bonded to each other in their outer peripheral portions 10.

Further, a rubber-like elastic member 2 is arranged within the high-pressure chamber 11.

A material of the rubber-like elastic member 2 preferably employs a rubber-like elastic material such as a nitrile rubber (NBR), a hydrogen additive nitrile rubber (HNBR), an acrylic rubber (ACM), a silicone rubber (VMQ), a fluorosilicone rubber (FVMQ), a fluorine-contained rubber (FKM), an ethylene propylene rubber (EPDM), a chloroprene rubber (CR), a chlorosulfonated polyethylene (CSM), a styrene butadiene rubber (SBR), a butyl rubber (IIR), and an urethane rubber (AU), which has a Shore hardness of Hs 50 or less.

The Shore hardness Hs is set to be equal to or less because a damping function of the metal diaphragms 1 and 1 is not inhibited.

According to the structure mentioned above, a space in which the fuel flows within the fuel chamber is not inhibited without changing the conventional attaching structure of the metal diaphragms 1 and 1, and it is possible to optionally set an amount of volume change caused by a resonance frequency and a pressure, so that it is possible to optimize the diaphragm damper performance.

Further, the metal diaphragms 1 and 1 are obtained by folding outer peripheral edges of two discoid members which are flat and are constructed by metal members into a curves shape and integrally bonding the outer peripheral edges to each other, and a discoid space chamber forming a high-pressure chamber 11 is formed in an inner portion of the metal diaphragms 1 and 1.

A welding means or a caulking means is appropriately selected and used for integrally bonding.

The rubber-like elastic member 2 is constructed by discoid sheet portions 25 and 26 which are provided so as to respectively come into contact with two discoid metal diaphragms 1 and 1, and a plurality of projections 251 and 261 which are circumferentially arranged between the sheet portions 25 and 26.

Further, the rubber-projections 251 and 261 are integrally formed with the sheet portions 25 and 26 as is apparent from FIG. 2, and are structured such as to extend from the one sheet portions 25 and 26 toward surfaces of the other sheet portions 25 and 26.

More specifically, as shown in FIG. 3, three rubber projections 261 are arranged on the one surface of the sheet portion 26 so as to be circumferentially uniform (at intervals of 120 degree). In the same manner, three rubber projections 261 having the same shape are arranged on the one surface of the other sheet portion 25 so as to be circumferentially uniform (at intervals of 120 degree) in the same manner.

In the present embodiment, three rubber projections 251 and 261 are respectively arranged on the one surfaces of the sheet portions 25 and 26 uniformly, that is, six rubber projections are totally provided, as shown by a broken line in FIG. 1, however, at least two rubber projections may be respectively provided, totally four rubber projections may be provided.

Further, the diaphragm damper is finished by adhering a surface where the rubber projections 251 and 261 of the sheet portions 25 and 26 are not provided, to each of the inner surfaces of the metal diaphragms 1 and 1 by an adhesive agent, thereafter assembling them in such a manner that the rubber projections 251 and 261 of the sheet portions 25 and 26 are deviated from each other at 60 degree, and integrating the outer peripheral portions 10 of two discoid metal diaphragms 1 and 1 by welding.

According to the structure mentioned above, a space in which the fuel flows within the fuel chamber is not inhibited without changing the conventional attaching structure of the metal diaphragms 1 and 1, and it is possible to optionally set an amount of volume change caused by a resonance frequency and a pressure, so that it is possible to optimize the diaphragm damper performance.

Further, since a plurality of rubber projections 251 and 261 are structured such as to be uniformly arranged on the circumference which is less deformed in the outer peripheral side of the metal diaphragms 1 and 1, it is possible to effectively damp the resonance of the metal diaphragms without inhibiting the deformation of the center portion which is most deformed in the metal diaphragms 1 and 1.

Further, since the rubber projections 251 and 261 are structured such as to extend alternately from the one sheet portions 25 and 26 toward the surfaces of the other sheet portions 25 and 26, as shown in FIG. 2, the balance of the rubber-like elastic members 2 and 2 is good, and it is possible to effectively damp the resonance of the metal diaphragms 1 and 1.

Further, as shown in the drawing, leading ends of the rubber projections 251 and 261 are formed into a circular arc shape in their cross section.

As a result, a good following property to the deformation of the metal diaphragms 1 and 1 can be obtained, and it is possible to effectively damp the resonance of the metal diaphragms 1 and 1.

Next, a description will be given of the other diaphragm damper according to the present invention on the basis of FIGS. 4 to 7.

A different point from the diaphragm damper described previously exists in a point that the rubber-like elastic member 2 is provided in the center portion of the metal diaphragms 1 and 1.

Figure 5:
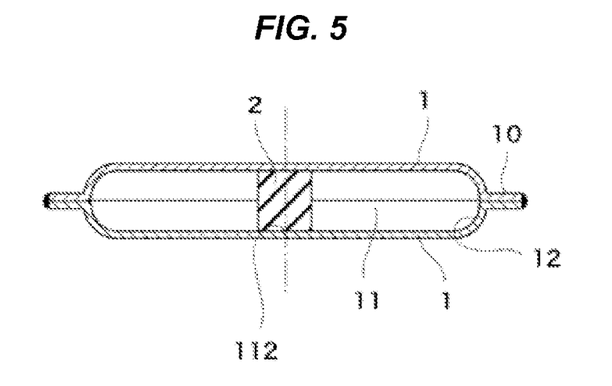
FIG. 5 is a cross sectional view along a line A-A in FIG. 4.
Figure 6:
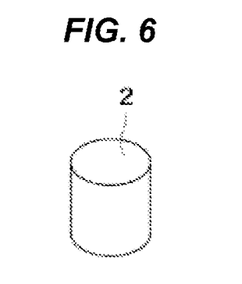
FIG. 6 is a three-dimensional perspective view of a rubber-like elastic member which is used in FIG. 5.

The rubber-like elastic member 2 is formed into a columnar shape, and is arranged in a center portion 112 of the high-pressure chamber 11 so as to be concentric with the metal diaphragms 1 and 1.

Further, both end portions in an axial direction of the columnar rubber-like elastic member 2 are in contact with each of two metal diaphragms 1 and 1.

Further, it is effective to adhere the columnar rubber-like elastic member 2 to the metal diaphragms for holding the rubber-like elastic member 2 to the center portion 112 of the high-pressure chamber 11.

Further, the columnar rubber-like elastic member 2 may be formed into a cylindrical shape obtained by boring a center portion of the rubber-like elastic member 2. In the case of the cylindrical shape mentioned above, the rubber-like elastic member 2 is more easily deformed. As a result, the damper function of the metal diaphragms 1 and 1 is not inhibited.

Figure 7:
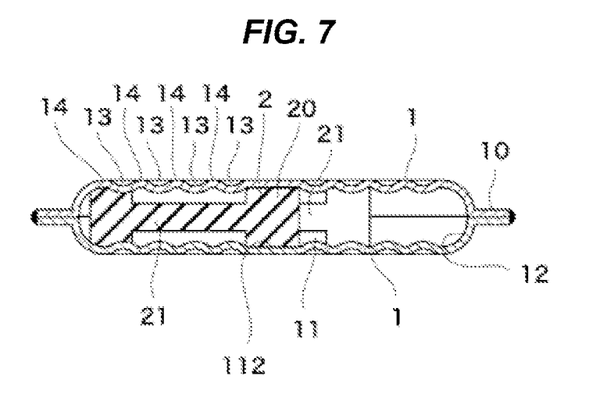
FIG. 7 is a view showing a second aspect of the diaphragm damper according to the present invention in the same manner as FIG. 5.
Figure 8:
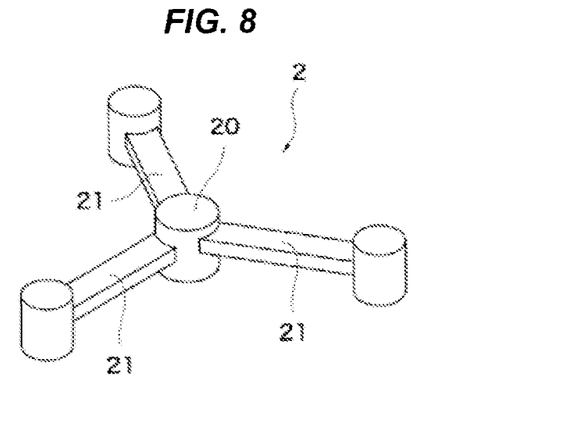
FIG. 8 is a three-dimensional perspective view of a rubber-like elastic member which is used in FIG. 7.

Next, a description will be given of a second aspect of the diaphragm damper according to the present invention on the basis of FIGS. 7 and 8.

A different point from the aspect described above exists in a point that the rubber-like elastic member 2 is provided with a plurality of positioning leg portions 21 and 21 which come into contact with the outer peripheral side 12 of the high-pressure chamber 11, and a point that the metal diaphragms 1 and 1 are formed a repeated pattern of annular concave portions 13 and 13 and annular convex portions 14 and 14 which are formed into concentric circles.

Three positioning leg portions 21 are formed so that three positioning leg portions are uniformly arranged from the outer peripheral surface of the columnar member 21 which is positioned at the center.

Further, outer peripheral end portions of the positioning leg portions 21 and 21 are formed into a columnar projection shape.

According to the structure mentioned above, since it is possible to inhibit the rubber-like elastic member 2 from moving within the high-pressure chamber 11, it is possible to more stably damp the resonance of the metal diaphragms 1 and 1.

Further, since the metal diaphragms 1 and 1 are formed the repeated pattern of the annular concave portions 13 and 13 and the annular convex portions 14 and 14 which are formed into the concentric circles, it is possible to obtain a more secure pulsation absorbing action of the diaphragm damper.

Figure 9:
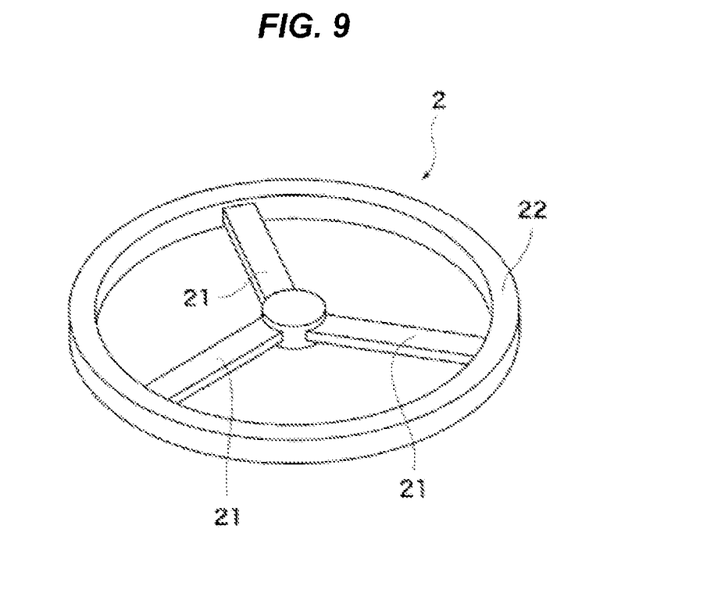
FIG. 9 is a three-dimensional perspective view of a rubber-like elastic member according to a third aspect which is used in the diaphragm damper according to the present invention.

Next, a description will be given of a third aspect of the rubber-like elastic member 2 which is used in the diaphragm damper according to the present invention on the basis of FIG. 9.

A different point from the second aspect described previously exists in a point that end portions of a plurality of positioning leg portions 21 and 21 are integrated with a ring-shaped portion 22 which comes into contact with the outer peripheral side 12 of the high-pressure chamber 11.

According to the structure mentioned above, since it is possible to further enhance the damping of the resonance of the metal diaphragms 1 and 1, and it is possible to more securely inhibit the rubber-like elastic member 2 from moving within the high-pressure chamber 11, it is possible to more stably damp the resonance of the metal diaphragms 1 and 1.

Figure 10:
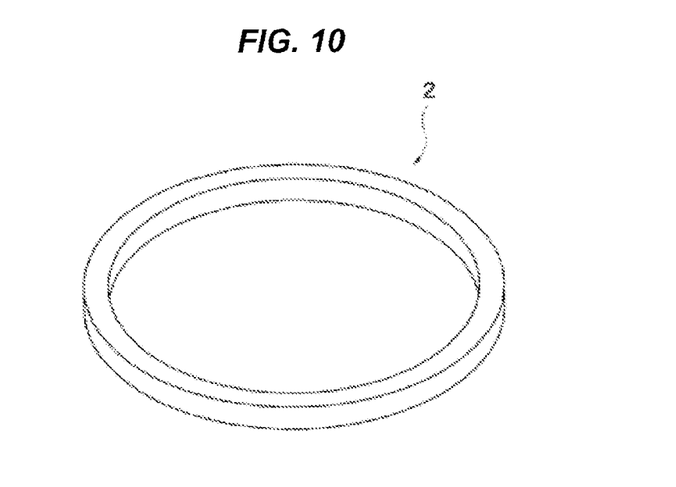
FIG. 10 is a three-dimensional perspective view of a rubber-like elastic member according to a fourth aspect which is used in the diaphragm damper according to the present invention.

Next, a description will be given of a fourth aspect of the rubber-like elastic member 2 which is used in the diaphragm damper according to the present invention on the basis of FIG. 10.

A different point from the third aspect described previously exists in a point that the rubber-like elastic member 2 is constructed only by the ring-shaped portion 22 according to the third aspect.

According to the structure mentioned above, since it is possible to further hold down a capacity which the rubber-like elastic member 2 occupies within the high-pressure chamber 11, and it is possible to inhibit the rubber-like elastic member 2 from moving within the high-pressure chamber 11, it is possible to more stably damp the resonance of the metal diaphragms 1 and 1.

Figure 11:
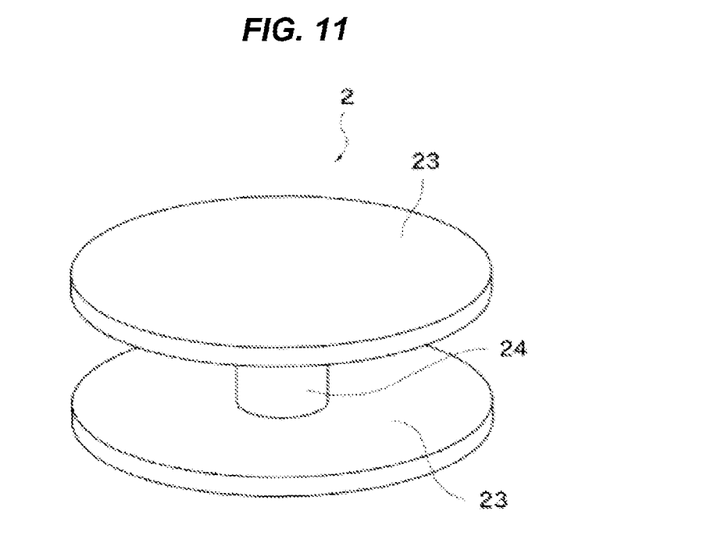
FIG. 11 is a three-dimensional perspective view of a rubber-like elastic member according to a fifth aspect which is used in the diaphragm damper according to the present invention.

Next, a description will be given of a fifth aspect of the rubber-like elastic member 2 which is used in the diaphragm damper according to the present invention on the basis of FIG. 11.

The rubber-like elastic member 2 is constructed by two discoid portions 23 and 23 which respectively come into contact with two metal diaphragms 1 and 1 with wide areas, and a connection portion 24 which connects two discoid portions 23 and 23 to each other in their center portions.

Figure 12:
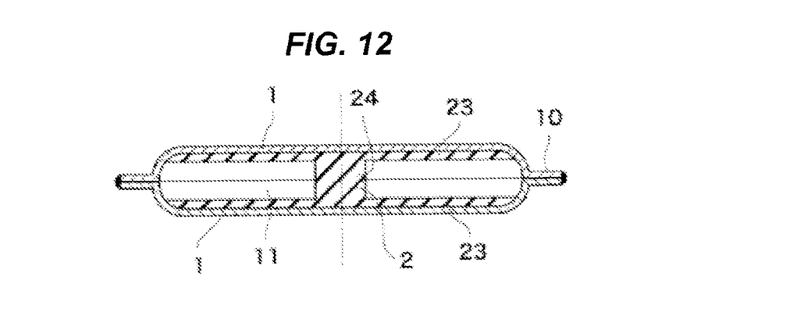
FIG. 12 is a view showing a diaphragm damper according to the present invention which uses the rubber-like elastic member shown in FIG. 11, in the same manner as FIG. 5.

Further, the rubber-like elastic member 2 is stored in such a manner that whole surfaces of two discoid portions 23 and 23 are respectively in contact with two metal diaphragms 1 and 1, as shown in FIG. 12.

According to the structure mentioned above, since the rubber-like elastic member 2 is in contact with the metal diaphragms 1 and 1 with the wider range, it is possible t more securely damp the resonance of the metal diaphragms 1 and 1.

Further, it goes without saying that the present invention is not limited to the modes for carrying out the invention mentioned above, but can employ the other various structures without deviating from the scope of the present invention.

INDUSTRIAL APPLICABILITY

The diaphragm damper according to the present invention is useful as the diaphragm damper which is used for reducing the pulsation generated in the high-pressure pump employed in the engine.

What is claimed is:

1. A diaphragm damper comprising:
  a high-pressure chamber formed by two discoid metal diaphragms which are bonded to each other in their outer peripheral portions such that a high-pressure gas is sealed in the high-pressure chamber, and
  a rubber-like elastic member arranged within said high-pressure chamber,
  wherein said rubber-like elastic member is constructed by:
    discoid sheet portions which are provided so as to come into contact with each of said two discoid metal diaphragms, and
    a plurality of rubber protections which are arranged circumferentially between said sheet portions, and
  wherein said rubber protections are integrally formed with said sheet portions and alternately extend from one of said sheet portions toward a surface of the other of said sheet portions.

2. The diaphragm damper according to claim 1, wherein leading ends of said rubber projections are formed into a circular arc shape in their cross sections.

3. The diaphragm damper according to claim 1, wherein said rubber-like elastic member is arranged in a center portion of said high-pressure chamber so as to be concentric with said metal diaphragms.

4. The diaphragm damper according to claim 3, wherein said rubber-like elastic member is provided with a plurality of positioning leg portions which come into contact with an outer peripheral side of said high-pressure chamber.

5. The diaphragm damper according to claim 4, wherein end portions of said plurality of positioning leg portions are integrated with a ring-shaped portion which comes into contact with an outer peripheral portion of said metal diaphragms.

6. The diaphragm damper according to claim 3, wherein said rubber-like elastic member is in contact with each of said two metal diaphragms.

7. The diaphragm damper according to claim 6, wherein said rubber-like elastic member is provided with a plurality of positioning leg portions which come into contact with an outer peripheral side of said high-pressure chamber.

8. The diaphragm damper according to claim 7, wherein end portions of said plurality of positioning leg portions are integrated with a ring-shaped portion which comes into contact with an outer peripheral portion of said metal diaphragms.

9. The diaphragm damper according to claim 1, wherein said rubber-like elastic member is in contact with each of said two metal diaphragms.

10. The diaphragm damper according to claim 9, wherein said rubber-like elastic member is provided with a plurality of positioning leg portions which come into contact with an outer peripheral side of said high-pressure chamber.

11. The diaphragm damper according to claim 10, wherein end portions of said plurality of positioning leg portions are integrated with a ring-shaped portion which comes into contact with an outer peripheral portion of said metal diaphragms.

12. The diaphragm damper according to claim 1, wherein said rubber-like elastic member is constructed by two discoid portions which come into contact with each of said two metal diaphragms in their whole surfaces, and a connection portion which connects said two discoid portions to each other in their center portions.

13. The diaphragm damper according to claim 1, wherein said metal diaphragms are formed in a repeated pattern of annular concave portions and annular convex portions which are formed into concentric circles.

* * * * *